(12) United States Patent
Hwang et al.

(10) Patent No.: US 8,036,287 B2
(45) Date of Patent: Oct. 11, 2011

(54) MULTI-CARRIER SPREAD SPECTRUM DEVICE USING CYCLIC SHIFT ORTHOGONAL KEYING, TRANSMITTER, RECEIVER, AND COMMUNICATION SYSTEM THEREOF

(75) Inventors: Jeng-Kuang Hwang, Chung-Li (TW); Yu-Lun Chiu, Chung-Li (TW)

(73) Assignee: Yuan-Ze University, Chung-Li (TW)

( * ) Notice: Subject to any disclaimer, the term of this patent is extended or adjusted under 35 U.S.C. 154(b) by 1006 days.

(21) Appl. No.: 11/979,410

(22) Filed: Nov. 2, 2007

(65) Prior Publication Data
US 2009/0059882 A1 Mar. 5, 2009

(30) Foreign Application Priority Data

Aug. 31, 2007 (TW) ................. 96132386 A (51) Int. Cl.
*H04K 1/10* (2006.01)
*H04L 27/28* (2006.01)

(52) U.S. Cl. ........ 375/260; 375/140; 375/146; 375/141; 375/264; 375/261

(58) Field of Classification Search ................. 375/260, 375/346, 264, 261, 298, 130, 140, 146, 141
See application file for complete search history.

(56) References Cited

U.S. PATENT DOCUMENTS

| 7,844,018 B2 * | 11/2010 | Tian et al. ..................... 375/346 |
| 2007/0014272 A1 * | 1/2007 | Palanki et al. ................. 370/344 |
| 2008/0298488 A1 * | 12/2008 | Shen et al. ..................... 375/260 |

* cited by examiner

*Primary Examiner* — Phuong Phu
(74) *Attorney, Agent, or Firm* — Ming Chow; Sinorica, LLC (57) ABSTRACT

A multi-carrier spread spectrum device using cyclic shift orthogonal keying includes: a modulation unit for receiving a first part of data bits and transforming the first part of data bits to a modulation symbol $d_i$ by modulation; a cyclic-shift unit for receiving a base code $c_{(0)}$ and a second part of data bits, and performing a cyclic-shift to the base code $c_{(0)}$ in accordance with the second part of data bits to generate a CSOK symbol $c_{(m_i)}$; and a multiplier for multiplying the modulation symbol $d_i$ by the CSOK symbol $c_{(m_i)}$ to generate a spread spectrum signal $c_i$.

4 Claims, 8 Drawing Sheets

MULTI-CARRIER SPREAD SPECTRUM DEVICE USING CYCLIC SHIFT ORTHOGONAL KEYING, TRANSMITTER, RECEIVER, AND COMMUNICATION SYSTEM THEREOF

BACKGROUND OF THE INVENTION

1. Field of the Invention

The present invention relates to a spread spectrum device, transmitter, receiver and communication system, and more particularly, to a multi-carrier spread spectrum device using a combination of cyclic-shift orthogonal keying (CSOK), transmitter, receiver and communication system, for use in a multi-carrier code division multiple access (MC-CDMA) transmission technique.

2. Description of Related Art

MC-CDMA, which is a multi-carrier transmission technique, combines advantages of both conventional Orthogonal Frequency Division Multiplexing (OFDM) and Code Division Multiple Access (CDMA) transmission technologies. In other words, the biggest advantage of MC-CDMA is that it can achieve frequency diversity and relatively higher bandwidth benefit at the same time. As in an OFDM system, MC-CDMA can allocate available frequency bands to several low transmission rate and orthogonal sub-carriers; and utilizes a cyclic prefix (CP) as guard interval to alleviate the inter-symbol interference (ISI) resulted from multi-path. MC-CDMA is different from Direct Sequence Code Division Multiple Access (DS-CDMA) that requires a high complexity rake receiver and interference-suppression technology to achieve a preferred frequency diversity effect. Utilizing an ordinary frequency-domain equalizing technology, MC-CDMA can still maintain a good bit error rate (BER) performance even under condition of multi-user coexistence. In other words, MC-CDMA can be considered as an OFDM system that applies a spread spectrum signal in the frequency-domain. When the spread spectrum factor equals 1, MC-CDMA becomes the OFDM system and it has no processing gain and the capacity of resisting channel fading. Conventionally, in a completely synchronous and ISI-free transmission environment, MC-CDMA uses the Walsh-Hadamard (WH) as the spread spectrum code to suppress the multi-user interference. However, the signal of MC-CDMA has a higher power average peak rate (PAPR), and the performance of MC-CDMA degrades greatly due to the inter-symbol interference (ISI). Therefore, when operating in a real channel environment, the conventional MC-CDMA tends to degrade with respect to the bandwidth benefit and power benefit.

SUMMARY OF THE INVENTION

In attempt to solve the problem in the transmission bandwidth and power of the aforementioned MC-CDMA, a particular MC-CDMA technique is proposed, which is different from the conventional MC-CDMA system that uses only one group of spread spectrum codes to perform the data bits in the frequency-domain. The proposed MC-CDMA system mainly using cyclic-shift orthogonal keying (CSOK), in essence, uses multiple groups of spread spectrum codes to increase the bandwidth benefit. The present invention firstly provides a basic mode according to the CSOK's technical features. The basic mode includes a multi-carrier spread spectrum device using the CSOK technique, transmitter, receiver and communication system. Then, the present invention provides an extended mode that can further increase bit transmission rate. The extended mode can improve the bandwidth benefit, bit error rate (BER) performance and power average peak (PAPR) with more flexibility.

Accordingly, in one aspect, the present invention provides a multi-carrier spread spectrum device using CSOK according to the basic mode. The multi-carrier spread spectrum device using CSOK generally includes: a modulation unit which is configured to receive a first predetermined number of data bits and to transform the first predetermined number of data bits into a modulation symbol $d_i$ in a modulation manner; a cyclic shift unit which is configured to receive a base code $c_{(0)}$ and a second predetermined number of data bits, and to generate a CSOK symbol $c_{(m_i)}$ by performing a cyclic-shift operation for the base code $c_{(0)}$ in accordance with the second predetermined number of data bits, and a multiplier which is configured to generate a spread spectrum signal $c_i$ by means of multiplying the modulation symbol $d_i$ by the CSOK symbol $c_{(m_i)}$.

In another aspect, the present invention provides a transmitter in a MC-CDMA communication system according to the basic mode. The transmitter generally includes: a serial-to-parallel converter (S/P converter) configured to receive a set of data bits in a serial manner and to output a first part of data bits and a second part of data bits in parallel; a multi-carrier spread spectrum device using CSOK, which comprises: a modulation unit configured to receive the first part of data bits outputted from the S/P converter and to transform the first part of data bits into a modulation symbol $d_i$ in a modulation manner; a cyclic shift unit configured to receive a base code $c_{(0)}$ and the second part of data bits and to generate a CSOK symbol $c_{(m_i)}$ by performing a cyclic-shift operation for the base code $c_{(0)}$ in accordance with the second part of data bits, and a multiplier configured to generate a spread spectrum signal $c_i$ by means of multiplying the modulation symbol $d_i$ by the CSOK symbol $c_{(m_i)}$; a S/P converter configured to receive the spread spectrum signal $c_i$ in the serial manner and to output the spread spectrum signal $c_i$ in a parallel manner; an inversed fast Fourier transform unit configured to receive the spread spectrum signal $c_i$ outputted from the S/P converter and to generate a time-domain signal by performing an inversed discrete Fourier transform for the received spread spectrum signal $c_i$; and a CP insertion unit configured to insert a cyclic prefix (CP) with an interval $T_{CP}$ into the time-domain signal.

In another aspect, the present invention provides a receiver in a MC-CDMA communication system according to the basic mode. The receiver generally includes: a CP removal unit configured to remove a cyclic prefix (CP) from the received time-domain signal; a fast Fourier transform unit with a N-point length configured to generate a frequency-domain signal $r_i$ by performing the Fourier transform for the time-domain signal without the CP; a frequency-domain equalizer (FDE) configured to generate an equalized signal $y_i$ by performing frequency-domain equalizing for the frequency-domain signal $r_i$; a CSOK despread spectrum unit configured to receive the equalized signal and a base code $c_{(0)}$ to despread the equalized signal and a base code $c_{(0)}$ to a despread spectrum signal $z_i$; a CSOK decision unit configured to receive the despread spectrum signal $z_i$ and to transform the despread spectrum signal $z_i$ into a modulation symbol estimation value $\hat{d}_i$ and a CSOK symbol estimation value $\hat{m}_i$ according to a decision mechanism; a modulation symbol demapping unit configured to receive the modulation symbol estimation value $\hat{d}_i$ and to generate a first part of data bits based on demapping process; a CSOK symbol demapping unit configured to receive the CSOK symbol estimation value $\hat{m}_i$ and to generate a second part of data bits based on CSOK demapping process; and a P/S converter configured to generate a summed data bits of the first and second parts of data bits in a serial manner from the first and second parts of data bits in parallel.

In another aspect, the present invention provides a communication system based on an MC-CDMA technology according to the basic mode. The communication system generally includes:

a transmitter comprising: a S/P converter configured to receive a set of data bits in serial and convert the received data bits into a first part of data bits and a second part of data bits in parallel; a multi-carrier spread spectrum device using CSOK, comprising: a modulation unit configured to receive the first part of data bits outputted from the S/P converter and to transform the first part of data bits to a modulation symbol $d_i$ in a modulation manner; a cyclic shift unit configured to receive a base code $c_{(0)}$ and the second part of data bits, and to generate a CSOK symbol $c_{(m_i)}$ by performing a cyclic-shift operation for the base code $c_{(0)}$ in accordance with the second part of data bits; and a multiplier configured to generate a spread spectrum signal $c_i$ by means of multiplying the modulation symbol $d_i$ by the CSOK symbol $c_{(m_i)}$; a S/P converter configured to receive the spread spectrum signal $c_i$ in serial and to output the spread spectrum signal $c_i$ in parallel; an inversed fast Fourier transform (IFFT) unit configured to receive the spread spectrum signal $c_i$ outputted from the S/P converter, and to generate a time-domain signal by performing an inversed discrete Fourier transform for the received spread spectrum signal $c_i$; and a CP insertion unit configured to insert a cyclic prefix (CP) having a time interval $T_{CP}$ into the time-domain signal; and a receiver comprising: a CP removal unit configured to remove a CP from the received time-domain signal; a N-point fast Fourier transform (FFT) unit configured to generate a frequency-domain signal $r_i$ by performing Fourier transform for the time-domain signal with removed CP; a frequency-domain equalizer (FDE) configured to generate an equalized signal $y_i$ by performing frequency-domain equalizing for the frequency-domain signal $r_i$; a CSOK despread spectrum unit configured to receive the equalized signal and a base code $c_{(0)}$ to despread the equalized signal and a base code $c_{(0)}$ to a despread spectrum signal $z_i$; a CSOK decision unit configured to receive the despread spectrum signal $z_i$ and to transform the despread spectrum signal $z_i$ into a modulation symbol estimation value $\hat{d}_i$ and a CSOK symbol estimation value $\hat{m}_i$ according to a decision mechanism; a modulation symbol demapping unit configured to receive the modulation symbol estimation value $\hat{d}_i$ and to regenerate the first part of data bits by demapping process; a CSOK symbol demapping unit configured to receive the CSOK symbol estimate value $\hat{m}_i$ and to regenerate the second part of data bits by CSOK demapping process; and a P/S converter configured to generating summed data bits of the first and second parts of data bits in a serial manner from the first and second parts of data bits in parallel.

In still another aspect, the present invention provides an extended mode that can further increase the data bit transmission rate. The transmitter, receiver and communication system also make improvements over the respective transmitter, receiver and communication system according to the basic mode, and can therefore improve the bandwidth benefit, BER performance and PAPR with more flexibility.

The above two communication modes have at least the following characteristics:

(1) By changing from a single spread spectrum code system to a multiple codes spread spectrum system, the bandwidth benefit can be dramatically increased.

(2) With increasing of group number of orthogonal codes, the BER performance can be increased more obviously.

(3) By using Chu sequence as CSOK spread spectrum codes, spread spectrum code groups orthogonal to each other can be readily obtained.

(4) By taking advantage of the cyclicity of the Fourier transform, frequency-domain CS-MBOK despread spectrum unit and symbol demapping unit with high efficiency are achieved.

(5) Because of the lowered PAPR affect, the power benefit of the transmission terminal may be greatly increased.

(6) As the CDMA system, the new system is still capable of suppressing co-channel interference (CCI).

DETAILED DESCRIPTION OF THE PREFERRED EMBODIMENTS

The present invention discloses receiving and transmitting units for a wireless communication system. The principles of OFDM and CDMA signals provided in the conventional receiving and transmitting units have been known to those of ordinary skill in the art and are therefore not described in detail in the following description. Also, before at least one embodiment of the invention is explained in detail, it is to be understood that the drawings referred to in the following description are merely schematic views showing features of the present invention and are not made, also unnecessary to be made, according to practical dimensions.

Figure 1A:
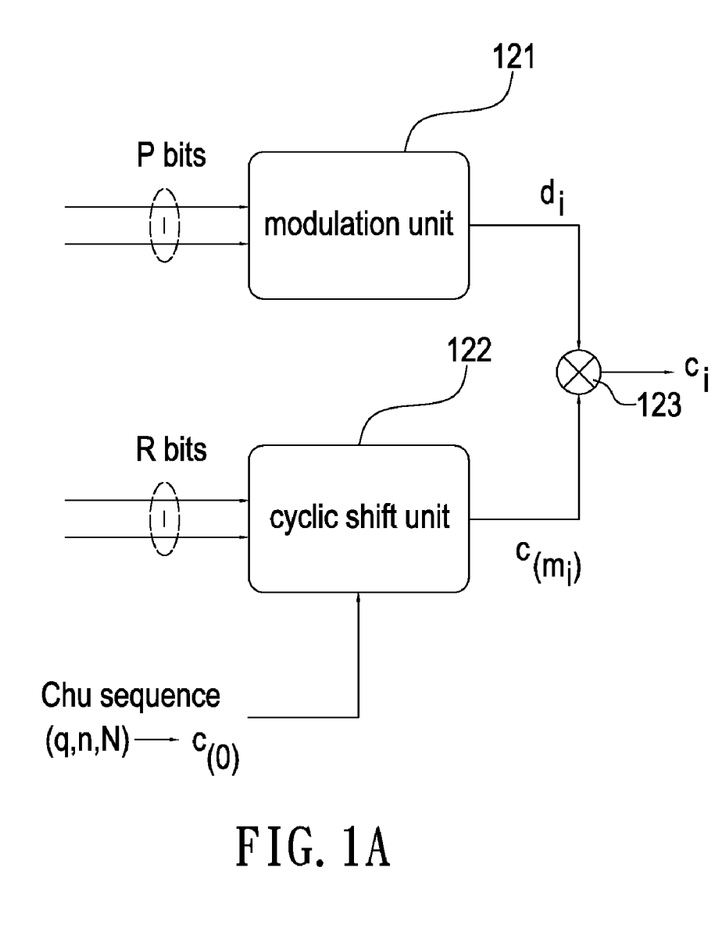
FIG. 1A is a block diagram of a basic mode for illustrating a multi-carrier spread spectrum device using cyclic-shift orthogonal keying in accordance with the present invention.

FIG. 1A illustrates a multi-carrier spread spectrum device 12 in a basic mode using a cyclic-shift orthogonal keying (CSOK) technique in accordance with a first preferred embodiment of the present invention. The multi-carrier spread spectrum device 12 includes a modulation unit 121, a cyclic shift unit 122, and a multiplier 123. The modulation unit 121 operates to receive P data bits and transforms the P data bits into a modulation symbol $d_i$ by means of a modulation manner. In other words, P is the number of bits to which each modulation symbol $d_i$ is able to map. The cyclic shift unit 122 operates to receive a base code $c_{(0)}$ and R data bits, and generates a CSOK symbol $c_{(m_i)}$ by performing a cyclic-shift operation for the base code $c_{(0)}$ according to the R data bits.

The multiplier 123 operates to generate a spread spectrum signal $c_i$ by means of multiplying the modulation symbol $d_i$ by the CSOK symbol $c_{(m_i)}$. The multi-carrier spread spectrum device 12 is characterized in that the base code $c_{(0)}$ is a sequence with a predetermined length N, and the predetermined length N is a power of two and is a positive integer, wherein the cyclic shift unit 122 is capable of generating N groups of spread spectrum codes, for example, which are the CSOK symbols $c_{(m_i)}$ in the present embodiment. With the orthogonal keying feature, each group of the spread spectrum codes (i.e., CSOK symbols $c_{(m_i)}$) can be mapped into R bits (R=$\log_2$ N). In other words, by performing a cyclic-shift operation for one group of spread spectrum codes, i.e., base codes $c_{(0)}=[c_{(0)} \ldots c_{N-1}]^T$, by different number of bits, that group of spread spectrum codes can generate N groups of spread spectrum codes $\{c_{(k)}, k=0, 1, \ldots, N-1\}$, wherein $c_{(k)}=[c_{0,k} \ldots c_{0,N-1} \, c_{0,0} \ldots c_{0,k-1}]^T$ is the K-th group of the spread spectrum codes obtained by performing a K-bits cyclic-shift. In addition, it is known, from the concept of cyclic-shift, that if the orthogonal characteristic of two groups of the spread spectrum codes that are inter-transformable by cyclic-shift (i.e. the inner product is zero) is desired, the base code $c_{(0)}$ is definitely a perfect correlated sequence.

In the above-described embodiment, the manner of modulation may be one of binary phase shift keying (BPSK), quadrature phase shift keying (QPSK), M-ray phase shift keying (MPSK), M-ray quadrature amplitude modulation (MQAM) and M-ray difference phase shift keying (MDPSK). In the present embodiment, the Chu sequence with a length of N-point and of multi-phase is utilized as the spread spectrum codes. If N is an even number, then Chu sequence can be obtained from the following equation:

$$c_n = e^{j\pi n^2 q/N} \quad 0 \leq n \leq N-1 \tag{1}$$

wherein, q and N are positive integers, and gcd(q, N)=1. Chu sequence has perfect correlation and constant envelope characteristics, thereby significantly decreasing the PAPR and hence improving non-linearity of an amplifier in the multi-carrier system. Because there are N-groups of spread spectrum codes $c_{(m_i)}$ available for mapping, each group of the spread spectrum codes may represent R data bits. Each group of the spread spectrum codes $c_{(m_i)}$ may be multiplied by a modulation symbol $d_i$ that is generated in another modulation manner to increase the number of bits transmitted. Therefore, the spread spectrum signal $c_i$ output from the multi-carrier spread spectrum device 12 may be represented by the following equation:

$$c_i = d_i c_{(m_i)} \tag{2}$$

wherein i denotes time, $d_i$ denotes modulation symbol, $m_i$ denotes cyclic-shift of the spread spectrum codes and $m_i=[s_{i,0} \ldots s_{i,R-1}]_{2 \to 10}$, $[\square]_{2 \to 10}$ represents a binary to decimal conversion algorithm, and $c_{(m_i)}$ denotes the $m_i$-th group of spread spectrum codes obtained by performing cyclic-shift by $m_i$ bits. Here, it should be noted that, if the symbol $d_i$ is constituted by BPSK, the signal represented by the above equation may be considered as so called M-ray Bi-orthogonal key (MBOK). The modulation symbol may alternatively be obtained by the above common analog modulation, e.g., QPSK, 16QAM, DQPSK, so as to increase the number of bits transmitted in the COSK signal.

Figure 1B:
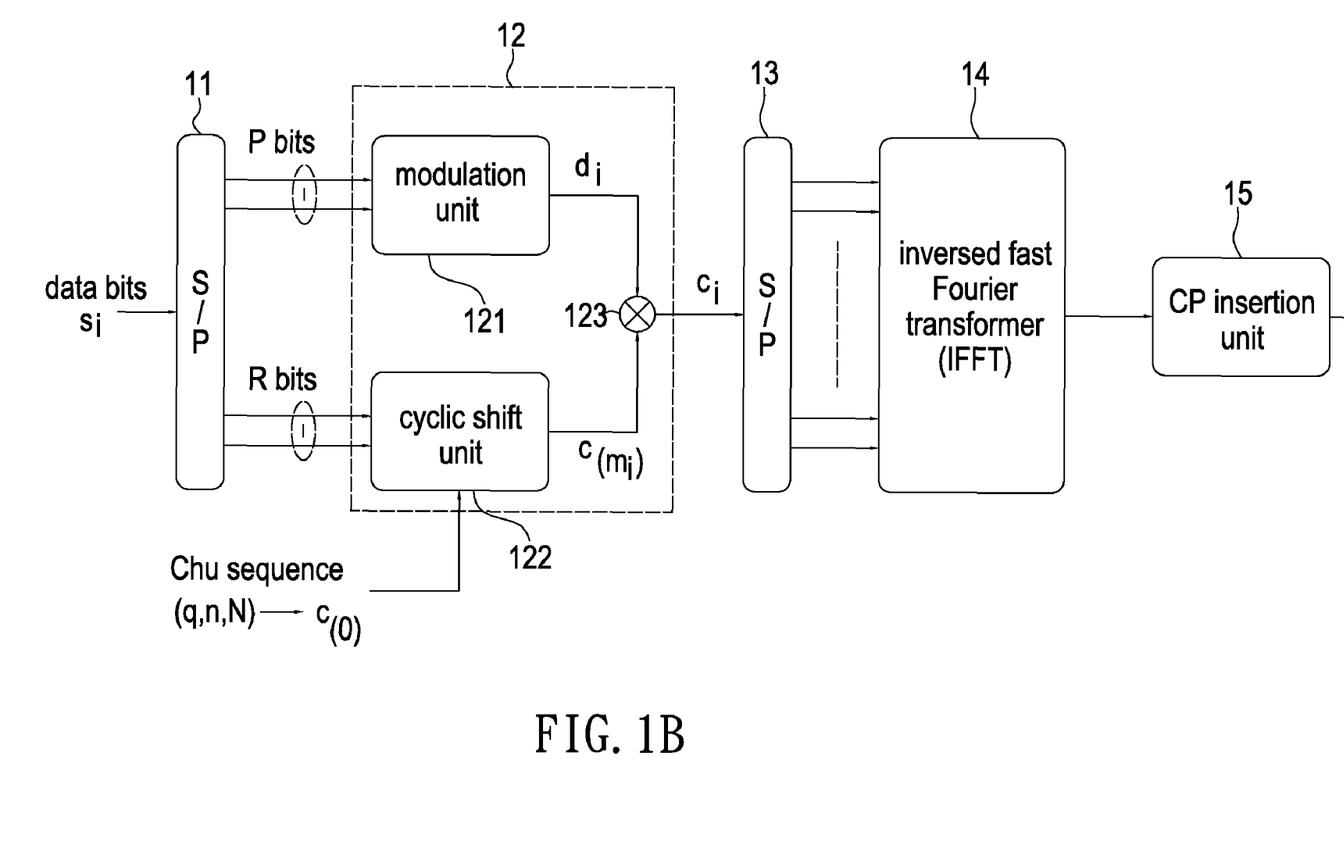
FIG. 1B is a block diagram of a basic mode for illustrating a transmitter in accordance with the present invention.

FIG. 1B illustrates a transmitter 10 at the basic mode in accordance with a second preferred embodiment of the present invention. The transmitter 10, which is suitable for use in an MC-CDMA communication system, includes a serial-to-parallel converter 11 (denoted by S/P in the figure), a multi-carrier spread spectrum device 12 using the CSOK technique, a S/P converter 13, an inversed fast Fourier transformer (IFFT) 14, and a CP insertion unit 15. The S/P converter 11 operates to receive a set of data bits in serial and outputs a first part of data bits (shown as "P bits" in the figure) and a second part of data bits (shown as "R bits" in the figure) in parallel. The multi-carrier spread spectrum device 12 using the CSOK technique operates to generate a spread spectrum signal $c_i$ by receiving the first part of data bits P and the second part of data bits R, and its structure, features and transmission signals are the same as that in the first embodiment. The S/P converter 13 operates to receive the spread spectrum signal $c_i$ in serial and outputs the spread spectrum signal $c_i$ in parallel. The IFFT 14 with N-point length operates to receive the spread spectrum signal $c_i$ outputted from the S/P converter 13, and generates a time-domain signal by performing an inversed discrete Fourier transform for the received spread spectrum signal $c_i$. The CP insertion unit 15 operates to insert a cyclic prefix (CP) into the time-domain signal, and the CP has a time interval $T_{CP}$ that must be larger than a maximum multi-path time delay.

Therefore, a time-domain signal can be generated by performing the inversed discrete Fourier transform for the corresponding spread spectrum code (i.e., CSOK symbol) and then inserting a CP with an interval $T_{CP}$ that must be larger than a maximum multi-path time delay. Thus, an interval of a group of time-domain signals may be denoted by $T_{FFT}+T_{CP}$, wherein $T_{FFT}$ denotes a Fourier transform interval. Therefore, the present system has a same channel bandwidth as that of conventional MC-CDMA. The new system proposed by the present invention maintains the advantages of the MC-CDMA, for example, the use of low complexity receiver, provision of processing gain and capacity for suppressing co-channel interference. Besides, by taking the advantageous of the CSOK multi-code system, the bandwidth benefit can be effectively improved when a larger N value is utilized to satisfy a larger processing gain. At the same time, the BER performance under the same bit energy can be improved because of the increased number of bits carried in one symbol time.

Figure 1C:
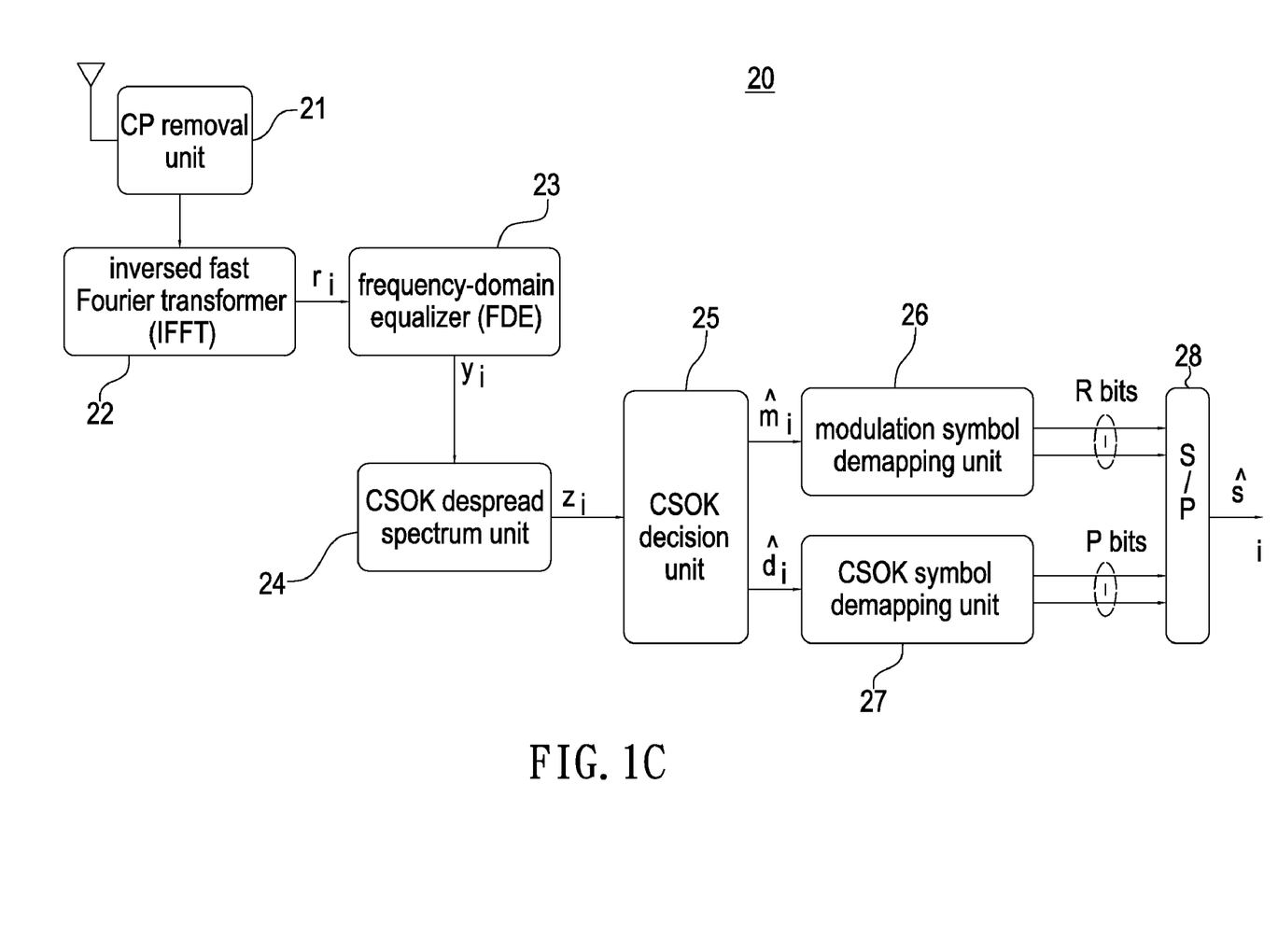
FIG. 1C is a block diagram of a basic mode for illustrating a receiver in accordance with the present invention.

FIG. 1C illustrates a receiver 20 at the basic mode in accordance with a third preferred embodiment of the present invention. The receiver 20, which is suitable for use in an MC-CDMA communication system, includes a CP removal unit 21, a N-point fast Fourier transformer (N-point FFT) 22, a frequency-domain equalizer (FDE) 23, a CSOK despread spectrum unit 24, a CSOK decision unit 25, a modulation symbol demapping unit 26, a CSOK symbol demapping unit 27, and a P/S converter 28. The CP removal unit 21 operates to remove a CP from a received time-domain signal. The N-point FFT 22 operates to generate a frequency-domain signal $r_i$ by performing a Fourier transform for the time-domain signal without the CP. The FDE 23 operates to generate an equalized signal $y_i$ by performing a frequency-domain equalization for the frequency-domain signal $r_i$. The CSOK despread spectrum unit 24 operates to receive this equalized signal and a base code $c_{(0)}$ (not shown) and despreads the equalized signal to a despread spectrum signal $z_i$. The CSOK decision unit 25 operates to receive the despread spectrum signal $z_i$ and transforms the despread spectrum signal $z_i$ into a modulation symbol estimation value $\hat{d}_i$ and a CSOK symbol estimation value $\hat{m}_i$ according to a decision mechanism. The modulation symbol demapping unit 27 operates to receive the modulation symbol estimate value $\hat{d}_i$ and generates a first part of data bits by demapping. The CSOK symbol demapping unit 26 operates to receive the CSOK symbol estimation value $\hat{m}_i$ and generates a second part of data bits by CSOK demapping process. The P/S converter 28 operates to generate the summed data bits of the first and second parts of data bits in parallel and converts thereof in serial.

In the above-described embodiment, the CSOK despread spectrum unit 24 despreads the equalized signal $y_i$ from the FDE 23 based on the time-domain or frequency-domain despread spectrum technology. When performing the time-domain despread spectrum, the CSOK despread spectrum unit 24 may further include a code correlation bank (not shown) for time-domain despread spectrum. When performing the frequency-domain despread spectrum, the CSOK despread spectrum unit further includes a frequency-domain despread spectrum device (not shown) having another FFT, another multiplier, another S/P converter and another IFFT for frequency-domain despread spectrum. In addition, the CSOK decision unit 25 transforms the despread spectrum signal $z_i$ into the modulation symbol estimation value $\hat{d}_i$ and the CSOK symbol estimation value $\hat{m}_i$ according to a decision mechanism based on a maximum likelihood based rule (ML), wherein the despread spectrum signal $z_i$ is generated by the code correlation bank 240 or the frequency-domain despread spectrum 241.

In the above embodiment, the ML algorithm is used to obtain the best equalizer (i.e., the FDE 23 in FIG. 1C) and the decision unit (i.e., the CSOK decision unit 25 in FIG. 1C) for transmitting signals in the second preferred embodiment. It can be seen, from the equation (2) of the transmitting signal in the second preferred embodiment, that the system transmits only one group of spread spectrum codes each time with only the modulation symbols being different. In the present receiver, after the CP is removed from the received signal, the output signal that is subject to the Fourier transform may be represented by the following equation:

$$r_i = Hc_i + Fw = d_i Hc_{(m_i)} + v \quad (3)$$

wherein, $$H = \begin{bmatrix} H_0 & & 0 \\ & \ddots & \\ 0 & & H_{N-1} \end{bmatrix}, [H_0 \cdots H_{N-1}]$$

denotes the frequency response of the channel, F is a N×N Fourier matrix, w is a white Gaussian noise with a power of $\sigma_n^2$. In order to obtain the best signal equalization and decision rule at the time of i, the inventor of the present invention uses ML rule to obtain the decision rule at the maximum of the likelihood function. From the signal models of the transmitting signal (2) and receiving signal (3), the following estimate rule can be obtained:

$$(\hat{d}_i, \hat{m}_i) = \underset{d_i, m_i}{\operatorname{argmin}} [\|r_i - Hc_i\|^2] \quad (4)$$

Here, the time subscript i is omitted for convenience of calculation. By calculating, the following equation can be obtained:

$$(\hat{d}, \hat{m}) = \underset{d,m}{\operatorname{argmax}} [\operatorname{Re}\{d^* c_{(m)}^H H^H r\}] \quad (5)$$

From the ML symbol decision rule represented by the above equation, it can be known that the best equalizer is a frequency-domain equalizer with a coefficient of $[H_0 \ldots H_{N-1}]^*$.

This result is typically so called maximum ratio combining (MRC) method. Therefore, the equalized signal $y_i$ output from the frequency-domain equalizer 23 may be represented by the following equation:

$$y_i = H_i^H r_i \quad (6)$$

In addition, the despread spectrum signal $z_i$ output from the CSOK despread spectrum unit 24 includes a real path despread spectrum signal $z_i^I$ (not shown) and an imaginary path despread spectrum signal $z_i^Q$ (not shown), then an output $z_m$ of the code correlation bank (not shown) of m-th group can be represented by the following equation:

$$z_m = c_{(m)}^H y = z_m^I + j z_m^Q \quad (7)$$

Therefore, the obtained best decision rule based on ML rule may be represented by the following equation:

$$(\hat{d}, \hat{m}) = \underset{d,m}{\operatorname{argmax}} [\operatorname{Re}\{d^* z_m\}] \quad (8)$$

If the modulation unit 121 of the transmitter of the second preferred embodiment is QPSK, then the decision rule may be simplified as:

$$\hat{m} = \underset{m}{\operatorname{argmax}} [|z_m^I| + |z_m^Q|] \quad (9)$$

$$\hat{d} = \operatorname{sgn}[z_{\hat{m}}^I] + j \times \operatorname{sgn}[z_{\hat{m}}^Q]$$

If the modulation unit 121 is BPSK, then the decision rule may be:

$$\hat{m} = \underset{m}{\operatorname{argmax}} [|z_m^I|]; \hat{d} = \operatorname{sgn}[z_{\hat{m}}^I] \quad (10)$$

If the modulation unit 121 of the transmitter of the second preferred embodiment is QPSK, in addition to the obtained decision rule based on ML rule, the following rule is also often used by conventional systems:

$$\hat{m} = \underset{m}{\operatorname{argmax}} [|z_m^I + z_m^Q|] \quad (11)$$

$$\hat{d} = \operatorname{sgn}[z_{\hat{m}}^I] + j \times \operatorname{sgn}[z_{\hat{m}}^Q]$$

Figure 1D:
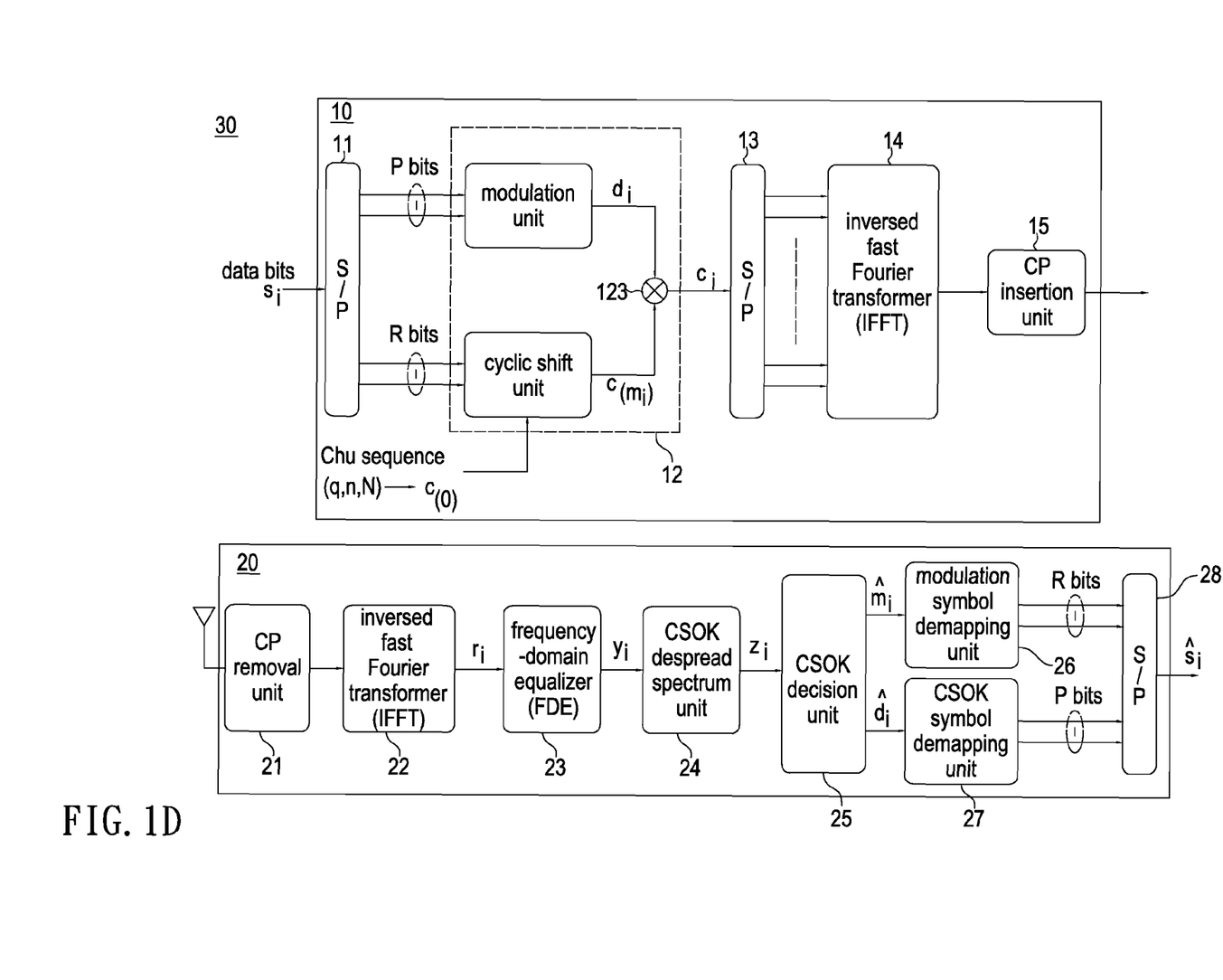
FIG. 1D is a block diagram of a basic mode for illustrating a communication system in accordance with the present invention.

FIG. 1D illustrates a communication system 30 at the basic mode based on MC-CDMA technology in accordance with a fourth embodiment of the present invention. The communication system 30 includes a transmitter 10 and a receiver 20. The transmitter 30 operates to receive a set of data bits, and generates to output a time-domain signal after performing appropriate the cyclic-shift, signal modulation and spread spectrum for the set of data bits. The receiver 20 operates to receive this time-domain signal and regenerates the data bits after performing frequency-domain equalizing, despread spectrum and demapping for the received time-domain signal. The transmitter 10 is constructed and featured in the same way as described in the second preferred embodiment. The receiver 20 is also constructed and featured in the same way as described in the third preferred embodiment.

Figure 2A:
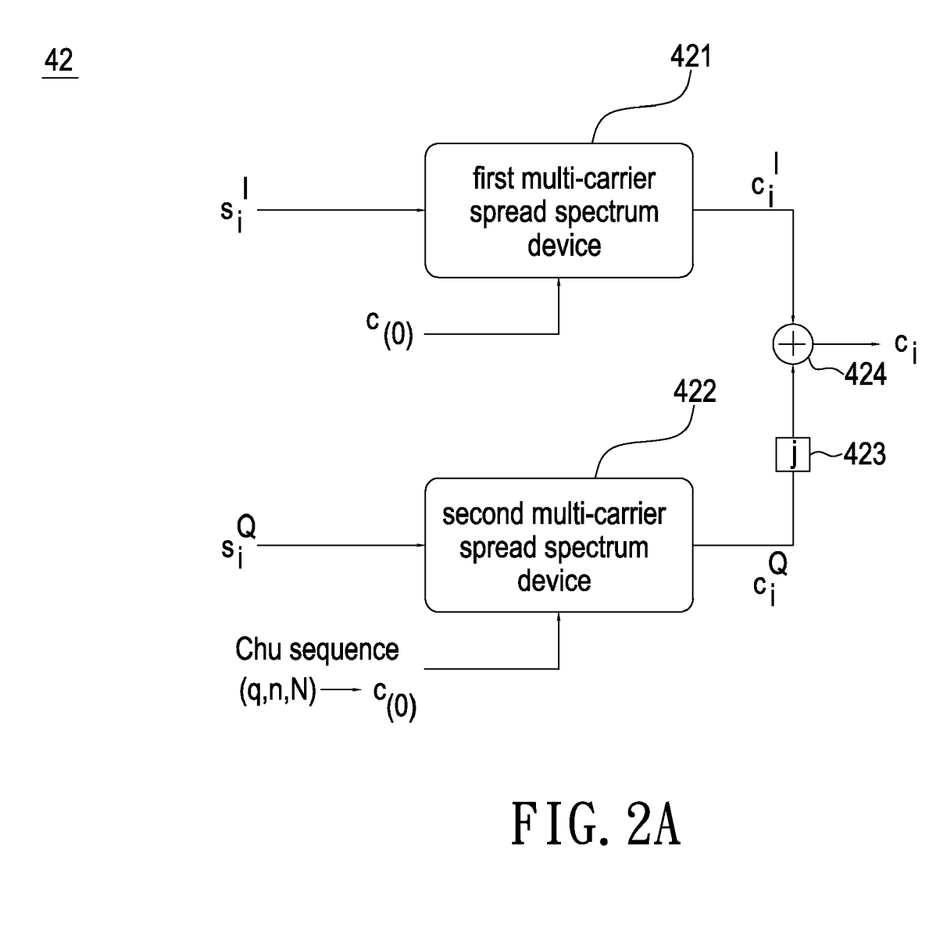
FIG. 2A is a block diagram of an extended mode for illustrating a multi-carrier spread spectrum device using cyclic-shift orthogonal keying in accordance with the present invention.

FIG. 2A illustrates a multi-carrier spread spectrum device 42 at an extended mode using the CSOK technique in accordance with a fifth preferred embodiment. The multi-carrier spread spectrum device using CSOK 42 includes a first multi-carrier spread spectrum device 421 using the CSOK technique, a second multi-carrier spread spectrum device 422 using the CSOK technique, a phase rotation unit 423 and an adder 424. The first multi-carrier spread spectrum device 421 operates to receive a base code $c_{(0)}$ and a first set of data bits $S^I_i$ and generates a first spread spectrum signal $c_i^I$ by performing spread spectrum for the first set of data bits. The second multi-carrier spread spectrum device 422 operates to receive a base code $c_{(0)}$ and a second set of data bits $S^Q_i$ and generates a second spectrum signal $c_i^Q$ by performing spread spectrum for the second set of data bits. The phase rotation unit 423 operates to rotate phase of the second spread spectrum signal $c_i^Q$ such that its output has a 90-degrees different phase relative to the input spectrum signal $c_i^Q$. The adder 424 operates to generate a summed spread spectrum signal $c_i$ by summing up the first spread spectrum signal $c_i^{\,1}$ and the output with a different phase. Accordingly, the signal inputted to the IFFT may be represented by the following equation:

$$c_i = c_i^I + j c_i^Q = d_i^I c_{(m_i^I)} + j d_i^Q c_{(m_i^Q)} \tag{12}$$

wherein i denotes time, $d_i$ denotes modulation symbol, $m^I_i$ denotes cyclic-shift relative to the first spread spectrum signal $c_i^I$, $m^Q_i$ denotes cyclic-shift relative to the second spread spectrum signal $c_i^Q$. In addition, the first multi-carrier spread spectrum device 421 and the second multi-carrier spread spectrum device 422 are constructed and featured in the same way as described in the first preferred embodiment, and the manner of modulation in the present embodiment is BPSK.

Figure 2B:
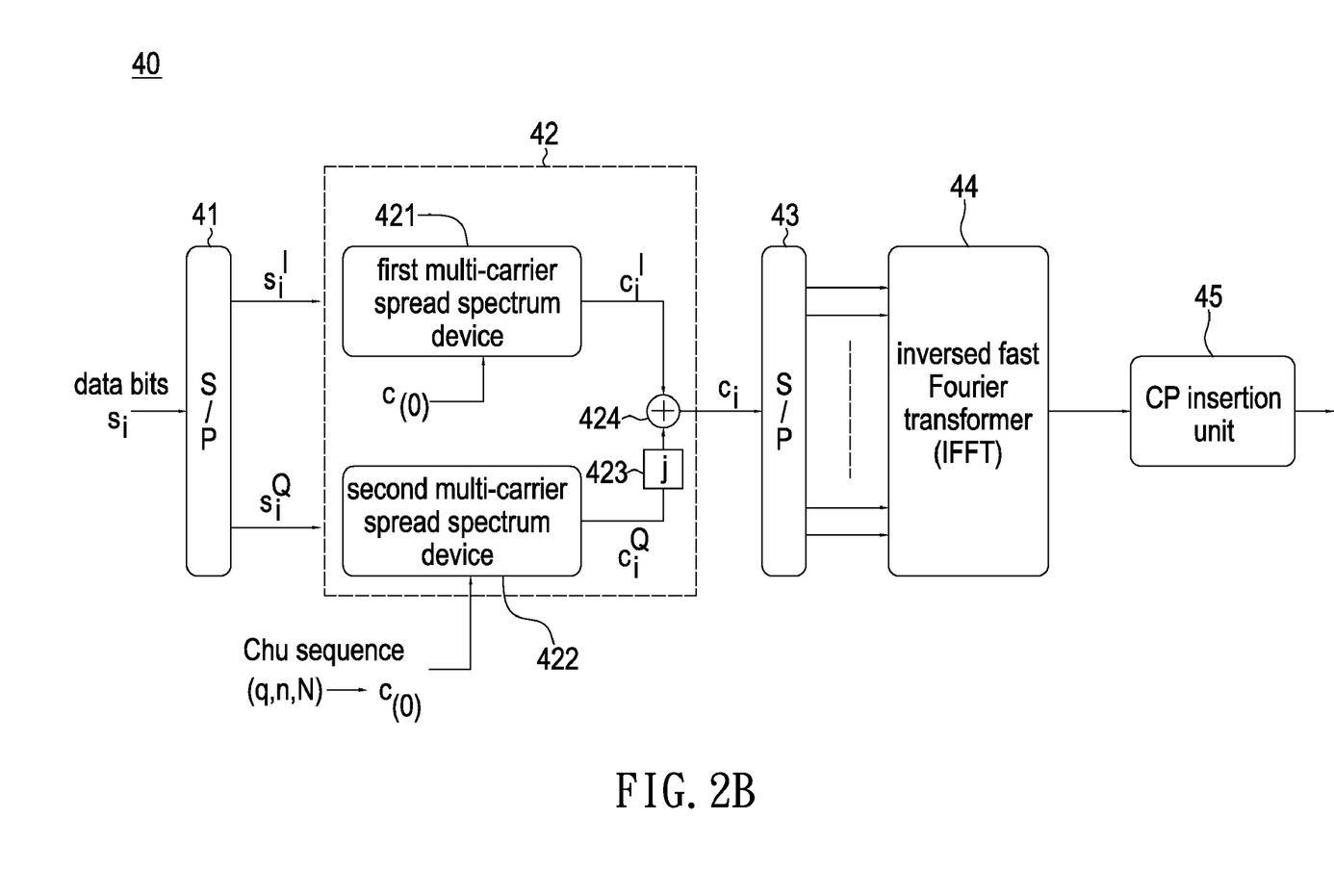
FIG. 2B is a block diagram of an extended mode for illustrating a transmitter in accordance with the present invention.

FIG. 2B illustrates a transmitter 40 at the extended mode in accordance with a sixth preferred embodiment of the present invention. The transmitter 40, which is used in an MC-CDMA communication system, includes a S/P converter 41, a multi-carrier spread spectrum device 42, a S/P converter 43, an IFFT 44 and a CP insertion unit 45. The S/P converter 41 operates to receive two sets of data bits $S_i$ in serial and outputs a first set of data bits $S^I_i$ and a second set of data bits $S^Q_i$ in parallel after S/P conversion. The multi-carrier spread spectrum device 42 operates to receive the first set of data bits $S^I_i$ and the second set of data bits $S^Q_i$ and generates to output a spread spectrum signal $c_i$ after performing spread spectrum for the two sets of data bits, and is constructed and featured in the same way as described in the fifth preferred embodiment. The S/P converter 43 operates to receive the spread spectrum signal $c_i$ in serial and outputs the spread spectrum signal $c_i$ in parallel after S/P conversion. The IFFT 44 operates to receive the spread spectrum signal $c_i$ outputted from the S/P converter 43 and generates a time-domain signal by performing an inversed discrete Fourier transform for the spread spectrum signal $c_i$. The CP insertion unit 45 operates to insert a cyclic prefix CP with a time interval $T_{CP}$ into the time-domain signal, wherein the time interval $T_{CP}$ must be larger than the maximum time delay of multi-path.

Figure 2C:
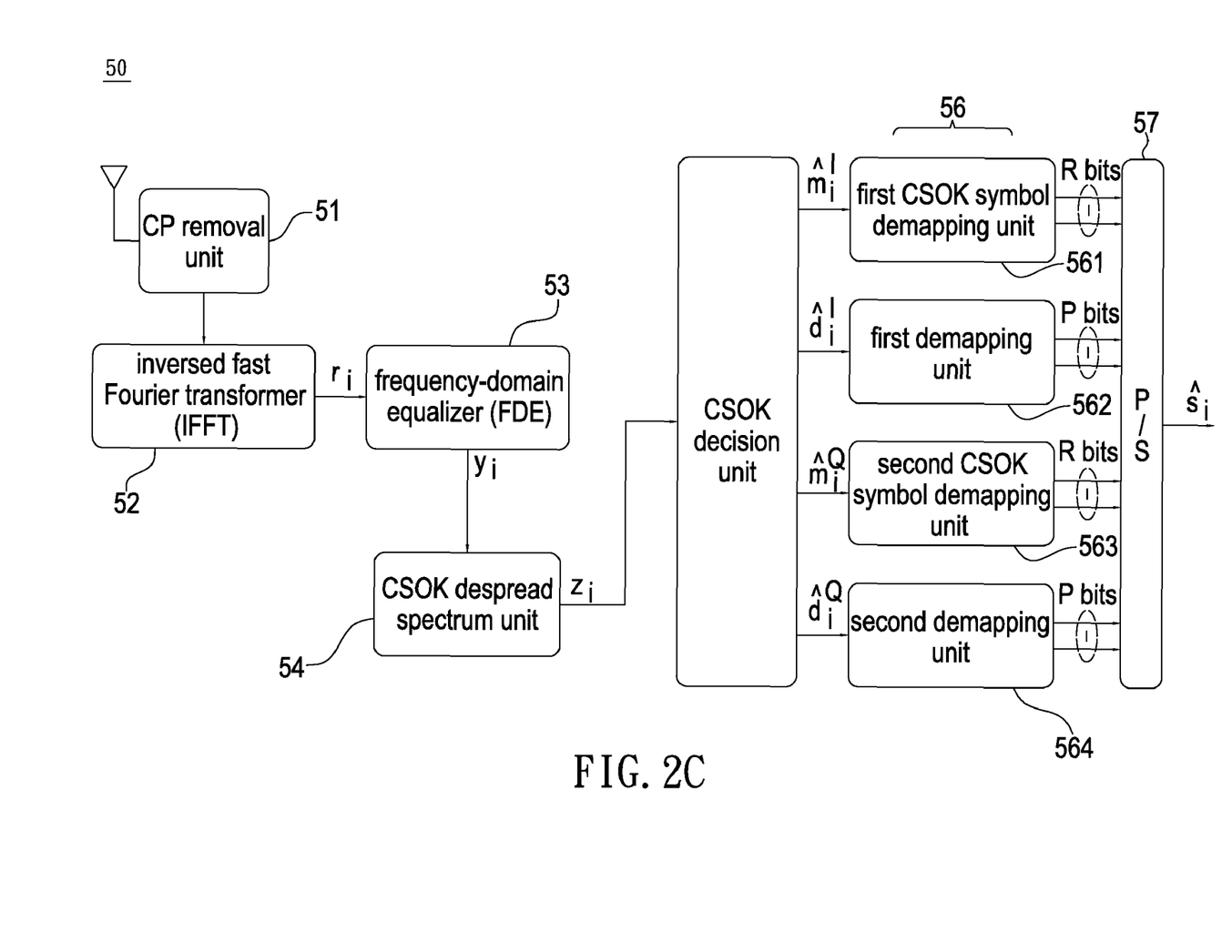
FIG. 2C is a block diagram of an extended mode for illustrating a receiver in accordance with the present invention.

FIG. 2C illustrates a receiver 50 at the extended mode in accordance with a seventh preferred embodiment of the present invention. The receiver 50, which is used in an MC-CDMA communication system, includes a CP removal unit 51, a N-point FFT 52, a frequency-domain equalizer 53, a CSOK despread spectrum unit 54, a CSOK decision unit 55, a symbol demapping unit 56 and a P/S converter 57. The CP removal unit 51 operates to remove the CP of the received time-domain signal. The N-point FFT 52 operates to generate a frequency-domain signal $r_i$ by performing a Fourier transform for the time-domain signal without the CP. The frequency-domain equalizer 53 operates to generate an equalized signal $y_i$ by performing frequency-domain equalization for the frequency-domain signal $r_i$. The CSOK despread spectrum unit 54 operates to receive the equalized signal $y_i$ and a base code $c_{(0)}$ (not shown) to despread the equalized signal $y_i$ to a despread spectrum signal $z_i$. The CSOK decision unit 55 operates to receive the despread spectrum signal $z_i$, and transforms the despread spectrum signal $z_i$ into a first modulation symbol estimation value $\hat{d}_i^{\,I}$, a first CSOK symbol estimation value $\hat{m}_i^{\,I}$, a second modulation estimation value $\hat{d}_i^{\,Q}$ and a second CSOK symbol estimation value $\hat{m}_i^{\,Q}$ according to a decision mechanism. The symbol demapping unit 56 further includes a first CSOK symbol demapping unit 561, a first demapping unit 562, a second CSOK symbol demapping unit 563 and a second demapping unit 564. The first CSOK symbol demapping unit 561 operates to receive the first CSOK symbol estimation value $\hat{m}_i^{\,I}$ and performs the CSOK demapping for the received estimation value $\hat{m}_i^{\,I}$. The first demapping unit 562 operates to receive the first modulation symbol estimation value $\hat{d}_i^{\,I}$ and performs demapping for the received estimation value $\hat{d}_i^{\,I}$. The second CSOK symbol demapping unit 563 operates to receive the second CSOK symbol estimate value $\hat{m}_i^{\,Q}$ and performs the CSOK demapping for the received estimation value $\hat{m}_i^{\,Q}$. The second demapping unit 564 operates to receive the second modulation symbol estimation value $\hat{d}_i^{\,Q}$ and performs demapping for the received estimation value $\hat{d}_i^{\,Q}$. The P/S converter 57 operates to generate a group of data bits which includes an estimated first set of data bits and an estimated second set of data bits by performing P/S conversion for the symbol estimation values that are already subject to the modulation and CSOK symbol demapping as described above.

In the above-described embodiment, the despread spectrum signal $z_i$ consists of a real path despread spectrum signal $z_i^{\,1}$ (not shown) and an imaginary path despread spectrum signal $z_i^{\,Q}$ (not shown). The ML algorithm is used to obtain the best equalizer (i.e., the frequency-domain equalizer 53 in FIG. 2C) and decision unit (i.e., the CSOK decision unit 54 in FIG. 2C) for transmitting signals in the fifth preferred embodiment. It can be seen, from the equation (12) of the transmitting signals in the fifth preferred embodiment, that in the present receiver, after the CP is removed from the received signal, the output signal through the FFT may be represented by the following equation:

$$r_i = [d_i^I H c_{(m_i^I)} + j d_i^Q H c_{(m_i^Q)}] + v \tag{13}$$

To obtain the best equalization and decision rules at the time i, the inventers uses the ML rule to obtain the decision rule at a maximum of the Likelihood function. From the signal models of the transmitting signal (12) and receiving signal (13), the following estimate rule may be achieved:

$$(\hat{d}, \hat{m}) = \underset{\{d,m\}}{\mathrm{argmin}} \, [ \| r - (d^I H c_{(m^I)} + j d^Q H c_{(m^Q)}) \|^2 ] \tag{14}$$

wherein $\hat{d} = [\hat{d}^I\ \hat{d}^Q]$, $\hat{m} = [\hat{m}^I\ \hat{m}^Q]$. Here, the time subscript i is omitted for convenience of calculation. By calculating, the following equation can be obtained:

$$(\hat{d}, \hat{m}) = \underset{\{d,\hat{m}\}}{\mathrm{argmax}} \, [ d^I \mathrm{Re}\{ c_{(m^I)}^H H^H r \} + d^Q \mathrm{Im}\{ c_{(m^Q)}^H H^H r \} + d^I d^Q \mathrm{Im}\{ c_{(m^I)}^H |H|^2 c_{(m^Q)} \} ] \tag{15}$$

wherein function Re{x} is the real part of a complex number x, and function Im{x} is the imaginary part of the complex number x. From the ML symbol decision rule in the above equation, it can be known that the best equalizer is a frequency-domain equalizer with a coefficient of $[H_0 \ldots H_{n-1}]^*$. This result is so called MRC method, and the despread spectrum signal $z_i$ output from CSOK despread spectrum unit 54 consists of a real path despread spectrum signal $z_i^I$ (not shown) and an imaginary path despread spectrum signal $z_i^Q$ (not shown). The output $z_m^I, z_m e^Q$ of the m-th group code correlation bank of the real channel and imaginary channel can be represented by the following equation:

$$z_{m^I}^I = \text{Re}\{c_{(m^I)}^H y\};\tag{16}$$
$$z_{m^Q}^Q = \text{Im}\{c_{(m^Q)}^H y\}$$

Then, the decision rule may be represented by the following equation:

$$(\hat{d}, \hat{m}) = \underset{[d,m]}{\arg\max}\left[d^I z_{m^I}^I + d^Q z_{m^Q}^Q + d^I d^Q \text{Im}\{c_{(m^I)}^H |H|^2 c_{(m^Q)}\}\right]\tag{17}$$

If the channel effect caused by the multi-path, the decision rule may also be simplified as the following equation:

$$\hat{m} = \left[\underset{m^I}{\arg\max}[|z_{m^I}^I|] \quad \underset{m^Q}{\arg\max}[|z_{m^Q}^Q|]\right]\tag{18}$$
$$\hat{d} = \left[\text{sgn}[z_{\hat{m}^I}^I] \quad \text{sgn}[z_{\hat{m}^Q}^Q]\right]$$

In addition, the CP removal unit 51, the N-point FFT 52, the frequency-domain equalizer 53, the CSOK despread spectrum unit 54, the CSOK decision unit 55, the symbol demapping unit 56 and the P/S converter 57 are constructed and featured in the same way as described in the third embodiment.

Figure 2D:
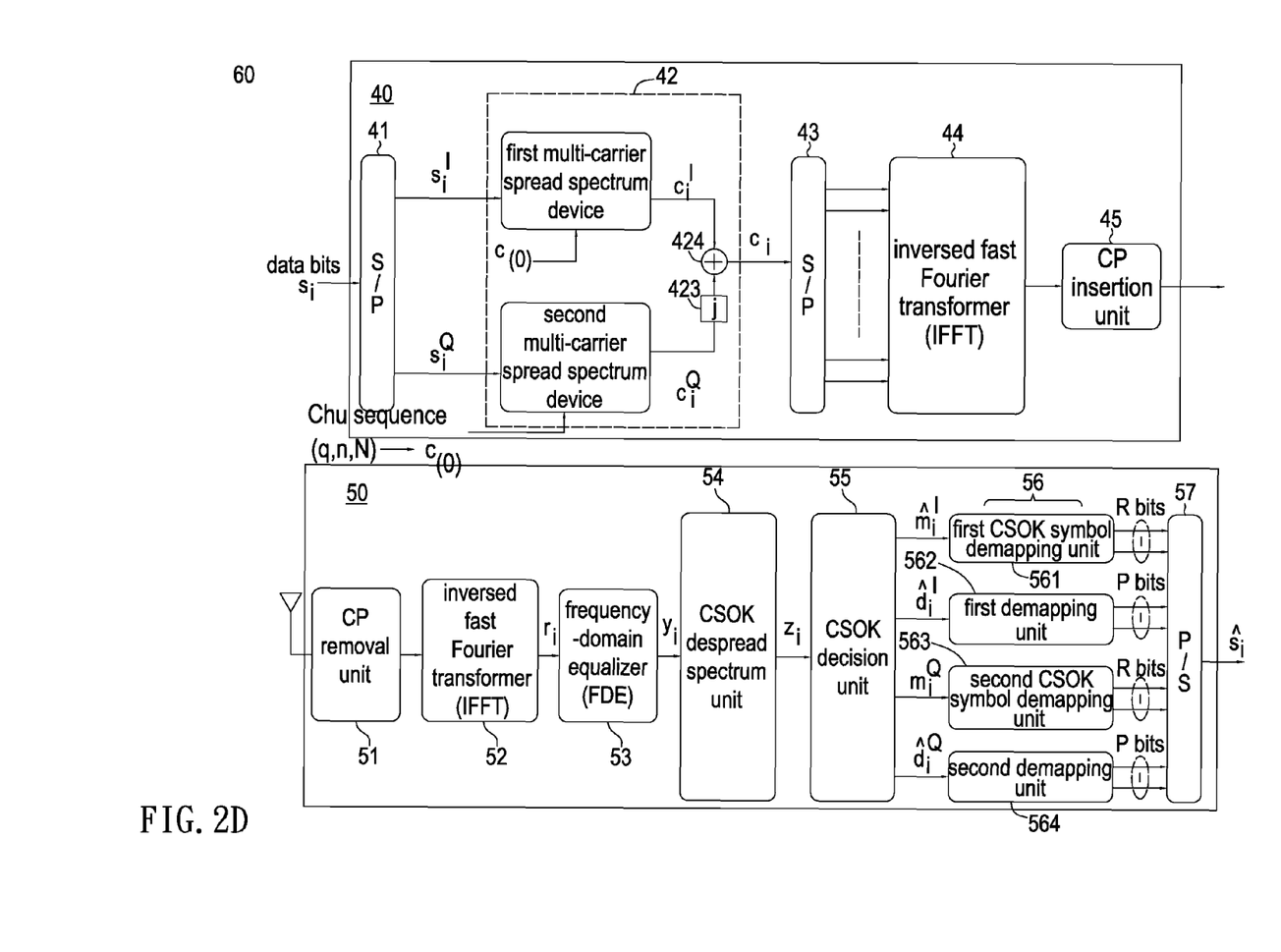
FIG. 2D is block diagram of an extended mode for illustrating a communication system in accordance with the present invention.

FIG. 2D illustrates a communication system 60 at the extended mode based on MC-CDMA technology in accordance with an eighth embodiment of the present invention. The communication system 60 includes a transmitter 40 and a receiver 50. The transmitter 40 operates to receive two sets of data bits $S_i$ including a first set of data bits and a second set of data bits, and generates to output a time-domain signal after performing appropriate cyclic-shift, signal modulation and spread spectrum for the sets of data bits $S_i$. The receiver 50 operates to receive this time-domain signal and regenerates the two sets of data bits $\hat{S}_i$ after performing frequency-domain equalizing, despread spectrum and demapping for the received time-domain signal. The transmitter 40 is constructed and featured in the same way as described in the sixth preferred embodiment, and the receiver 50 is constructed and featured in the same way as described in the seventh embodiment.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A multi-carrier spread spectrum device, which uses CSOK, comprising:
    a first multi-carrier spread spectrum unit configured to receive a base code and a first set of data bits and to generate a first spread spectrum signal by means of performing a spread spectrum process;
    a second multi-carrier spread spectrum unit configured to receive the base code and a second set of data bits and to generate a second spread spectrum signal by means of performing the spread spectrum process;
    a phase rotation unit configured to generate a third spread spectrum signal which has a different phase by means of rotating the second spread spectrum signal; and
    an adder configured to generate a spread spectrum signal by means of adding the first spread spectrum signal to the third spread spectrum signal;
    wherein each of the first multi-carrier spread spectrum device and the second multi-carrier spread spectrum device further comprises a modulation unit, a cyclic shift unit and an multiplier.

2. The multi-carrier spread spectrum device in accordance with claim 1, wherein the modulation unit uses BPSK.

3. The multi-carrier spread spectrum device in accordance with claim 1, wherein the base code is a Chu sequence.

4. The multi-carrier spread spectrum device in accordance with claim 3, wherein the Chu sequence has a predetermined length N, and the number of bits R of the second set of data bits is obtained from the equation: $R = \log_2 N$.

* * * * *